Feb. 19, 1952     O. VON ZELEWSKY     2,586,126
SPINDLE SUPPORT FOR MACHINE TOOLS

Filed April 18, 1950     2 SHEETS—SHEET 1

INVENTOR:
Ottomar von Zelewsky
BY
Richards y Geier
ATTORNEYS

Patented Feb. 19, 1952

2,586,126

UNITED STATES PATENT OFFICE 2,586,126

SPINDLE SUPPORT FOR MACHINE TOOLS

Ottomar von Zelewsky, Neuhausen-on-the-Rheinfall, Switzerland, assignor to Georg Fischer Aktiengesellschaft, Schaffhausen, Switzerland, a company of Switzerland Application April 18, 1950, Serial No. 156,535
In Switzerland November 30, 1949

2 Claims. (Cl. 82—30)

This invention relates to machine tools and refers more particularly to spindle or stock supports of machine tools.

In prior art roller bearings were used for supporting the work spindle of machine tools close to the location of the work. It was found that bearings and supports of this type were often unsatisfactory since a slight shifting of the rings of the bearings to one side during the operation of the clamping elements could result in a shifting of the work spindle. On the other hand, the proper location and operation of the work spindle is absolutely essential for the proper operation of the machine tool. Heretofore it was attempted to correct these errors at the time the roller bearings were built in by scraping or filing the clamping elements; this work consumes an excessive amount of time and has the further disadvantage that it must be carried out over and over again at each new setting of the bearing combination.

An object of the present invention is to eliminate these drawbacks and to provide spindle supports which can be readily and conveniently built in and which will assure perfect location of the spindle and the location of which will remain unchanged.

Other objects of the present invention will become apparent in the course of the following specification.

The objects of the present invention may be realized through the provision of a support for the work spindle wherein the roller bearings are held tightly with radial play between rings provided with spherical surfaces.

The invention will appear more clearly from the following detailed description, when taken in connection with the accompanying drawings showing, by way of example, a preferred embodiment of the inventive idea.

Figure 1:
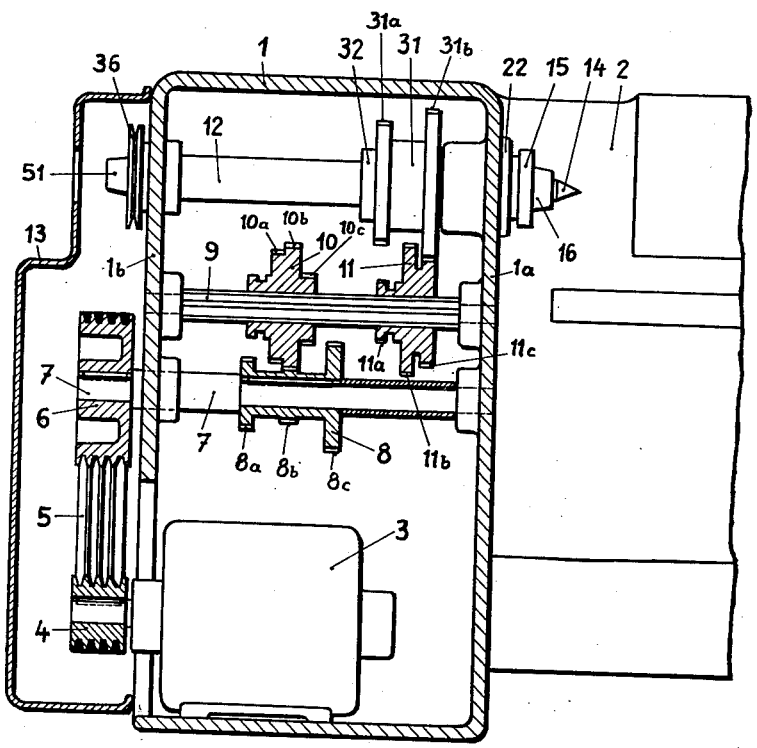
Figure 1 is a diagrammatic, vertical section through the headstock of a lathe.

The spindle support constructed in accordance with the present invention is shown in the drawings, by way of example, in its application to a lathe tool, only a part of which is illustrated in Figure 1.

The headstock casing 1 of the lathe 2 encloses any suitable motor 3 having a shaft upon which is keyed a pulley 4. The so-called wedge belt drive 5 transmits the drive from the pulley 4 to the pulley 6 which is keyed upon the first gear shaft 7. The shaft 7 carries a gear assembly 8 which is keyed thereon.

A second shaft 9 is located above the shaft 7 and carries gear aggregates 10 and 11 which rotate along with the shaft but may be shifted axially along the shaft by any suitable means not shown in the drawings. In the example illustrated the gear aggregate 8 has three gears 8a, 8b and 8c, while the gear aggregate 10 has the gears 10a, 10b and 10c. Similarly, the gear aggregate 11 has the gears 11a, 11b and 11c.

A rotary spindle 12 is located above the shaft 9 and has a gear wheel 31 provided with the gears 31a and 31b. It is apparent that by a suitable selection of meshing gears the drive of the spindle 12 may be varied within large limitations.

The belt drive is located within a suitable casing 13 which is held upon the casing 1, and which may be easily removed when necessary.

Figure 2:
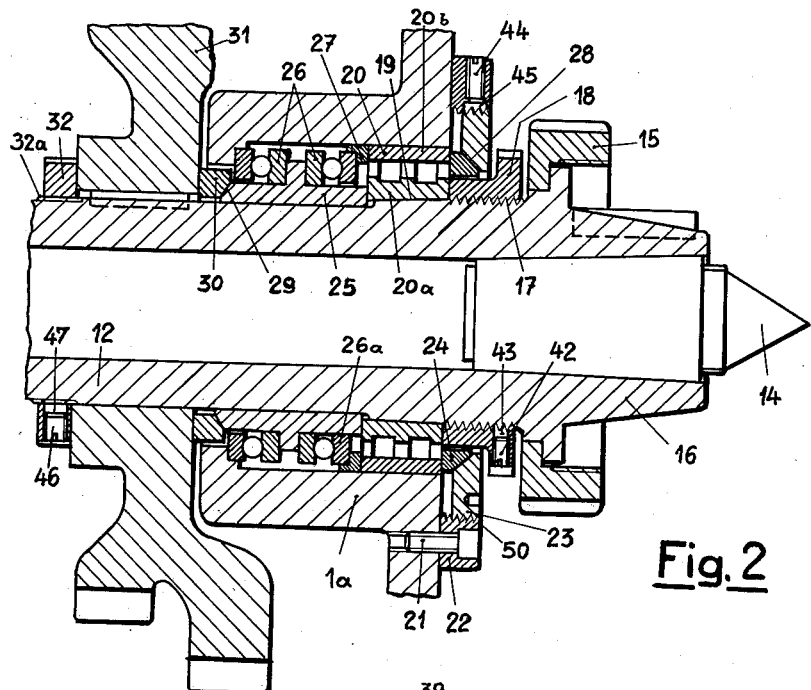
Figure 2 is a longitudinal section through the front bearing of the operating spindle on an enlarged scale.
Figure 3:
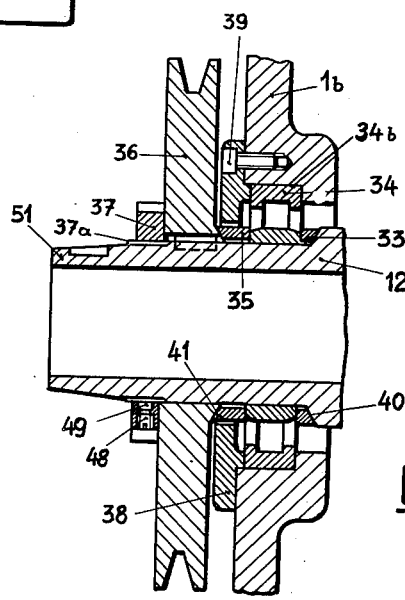
Figure 3 is a longitudinal section through the rear bearing of the work spindle.

The spindle 12 has a front bearing mounted in the portion 1a of the casing 1, and shown in greater detail in Figure 2, as well as a rear bearing mounted in the portion 1b of the casing 1, and illustrated in greater detail in Figure 3.

As shown in Figure 2, the spindle 12 terminates in a conical projection 16 and is firmly connected with a conical work holder 14. The spindle 12 carries a clamping ring 15 used for operating the clamping and holding devices such as tappers, clamping chucks and the like, which are not shown in the drawings, and which may be mounted upon the conical projection 16.

That portion of the spindle 12 which is located directly in front of the casing 1 is provided with threads 17 and carries a nut 18. A holding screw 42 and an insert 43 are used to clamp firmly the nut 18 upon the threads 17 of the spindle 12.

A portion of the spindle 12 which is located within the casing 1 has a conical surface 19 which carries a cylindrical roller bearing 20 comprising an inner ring 20a and an outer ring 20b. The inner ring 20a presses at its right side (looking in the direction of Figure 2) against a side surface of the nut 18.

A ring 22 which is provided with inner threads 50 is attached to the casing 1 by means of bolts 21 and serves as a flange enclosing a threaded ring 23 which is screwed into the ring 22. A set screw 44 and an insert 45 extend through the ring 22 and press against the ring 23 so as to prevent its turning in relation to the ring 22.

The ring 23 has an inner spherical surface which engages the corresponding surface 28 of an intermediate ring 24. The ring 24 presses against the right side (looking in the direction of Figure 2) of the outer ring 20b of the cylindrical roller bearing 20.

A distancing ring or sleeve 25 is mounted upon the spindle 12 next to the cylindrical roller bearing 20. The sleeve 25 carries two ball bearings 26. A distancing ring 27 is located between the outer end of ring 26a of the roller bearings 26 and the outer ring 20b of the bearing 20. It is apparent that the rings of the roller bearing 20 extend axially while the rings of the ball bearing 26 extend transversely thereto.

A distancing ring 30 is provided with a spherical surface 29 which is in engagement with a corresponding spherical end surface of the sleeve 25.

The gear wheel 31, a part of which is shown in Figure 2 is keyed upon the spindle 12 and is held axially by a nut 32 which is screwed upon a threaded surface 32a of the spindle 12, and which is held in place by a set screw 46 and an insert 47.

The spindle 12 has a rear end portion 51 shown in Figure 3. The support for this rear end of the spindle 12 includes an intermediate ring 33 having a spherical surface 40 which is in engagement with a corresponding spherical surface of the spindle 12. A cylindrical roller bearing 34 is located between the ring 33 and an intermediate ring 35 which engages the pulley 36 of a belt drive; the pulley 36 is keyed upon the spindle 12 and may serve for operating a feed drive which is not shown in the drawings.

The ring 33, the roller bearing 34, the ring 35 and the pulley 36 are all held by a nut 37 which is screwed upon the threaded portion 31a of the spindle 12 and which is held in place by a set screw 48 and an insert 49.

The outer ring 34b of the cylindrical roller bearing 34 is held in place in the casing wall 1b by means of a flange ring 38 which is attached to the wall 1b by bolts 39.

The intermediate ring 35 and the pulley 36 have a common spherical surface 41.

The end portion 51 of the work spindle can carry clamping elements or various work-holding devices.

The removal of the spindle 12 and its assembly are accomplished as follows:

When dismantling, firstly, the casing 13 (Fig. 1) is removed and then the nut 37 (Fig. 3) is unscrewed and withdrawn together with the pulley 36.

In the front support (Fig. 2) the set screw 46 is unscrewed, thereby loosening the nut 32. Then the bolts 21 are removed freeing the ring 22 although the inner threaded ring 23 remains in clamping engagement by means of the set screw 44. After the removal of the gear wheel 31 the rotary spindle 12 can be pulled out of the casing 1 to the right (looking in the direction of Figure 2).

For assembly purposes the same procedure is reversed.

The adjustment of the radial play of the front support shown in Figure 2 is carried out as follows:

Firstly, the set screw 46 and the nut 32 are loosened and thereupon the set screw 42 and the threaded flange 18 are also loosened. Then the nut 32 is screwed on until the radial play in the cylindrical roller bearing 20 has reached the desired amount. It is apparent that the turning of the nut 32 will move the gear wheel 31, the intermediate ring 30 and the distancing sleeve 25 so that the inner ring 20a of the cylindrical roller bearing 20 is shifted upon the conical surface 19 of the spindle 12, thus achieving the radial adjustment in the roller bearing 20.

Upon completion of this radial adjustment the threaded flange 18 is again screwed on upon the threads 17 of the spindle 12 and then is set by the set screw 42. Thereupon, the nut 32 is set by means of the set screw 46. It should be noted that this radial adjustment does not affect the axial adjustment of the device.

The axial adjustment of the front support shown in Figure 2 is carried out as follows:

Firstly, the set screw 44 located in the ring 22 is unscrewed. Then the ring 23 is turned by means of a suitable tool until the axial play of the two ball bearings 26 has attained the desired amount. This axial play of the ball bearings 26 is regulated by pressing the ring 23 against the outer ring 24 which transmits the pressure to the outer ring 20b of the cylindrical roller bearing 20, the distancing ring 27 and the end ring 26a of the axial ball bearings 26. Thereupon, the ring 23 is again held firmly by turning the set screw 44.

It should be noted that this axial adjustment does not influence the radial adjustment in any way.

It is apparent that the assembly, dismantling and adjustment of the rear support, shown in Figure 3, are carried out in a substantially similar manner.

An important advantage of the described support is that it avoids the clamping or jamming of the axial bearings and the radial bearings, as well as of the gear wheel since the intermediate rings of these bearings can be set upon spherical supporting surfaces even when the supports or clamping members have been shifted to a substantial extent.

It is apparent that the example shown above has been given solely by way of illustration and not by way of limitation, and that it is subject to many variations and modifications within the scope of the present invention. All such variations and modifications are to be included within the scope of the present invention.

What is claimed is:

1. In machine tools, in combination with a spindle having a conical portion, a roller bearing having an inner ring engaging said conical portion and an outer ring, said rings extending in the direction of the spindle axis, a sleeve enclosing another portion of said spindle and engaging said inner ring of the roller bearing, a ball bearing mounted upon said sleeve and having rings extending transversely to the spindle axis, a ring interposed between said roller bearing and said ball bearing, a ring located at the outer side of said roller bearing and having a spherical surface, a ring located at the inner side of said ball bearing and having a spherical surface engaging said sleeve, and adjustable clamping means engaging the second-mentioned and the third-mentioned rings.

2. In machine tools, in combination with a spindle having a conical portion, a roller bearing having an inner ring engaging said conical portion and an outer ring, said rings extending in the direction of the spindle axis, a sleeve enclosing another portion of said spindle and engaging said inner ring of the roller bearing, a ball bearing mounted upon said sleeve and having rings extending transversely to the spindle axis, a ring interposed between said roller bearing and said ball bearing, a ring located at the outer side of said roller bearing and having a spherical surface, a ring located at the inner side of said ball bearing and having a spherical surface engaging said sleeve, a threaded adjusting ring engaging the first-mentioned spherical surface, and adjusting means engaging the third-mentioned ring.

OTTOMAR von ZELEWSKY.

REFERENCES CITED

The following references are of record in the file of this patent:

UNITED STATES PATENTS

| Number | Name | Date |
| --- | --- | --- |
| 1,779,781 | Ryder | Oct. 28, 1930 |
| 1,984,718 | Wistrand | Dec. 18, 1934 |